(12) United States Patent
Balijepalli et al.

(10) Patent No.: US 9,150,752 B2
(45) Date of Patent: Oct. 6, 2015

(54) COATING COMPOSITION WITH TRISAMINE FUNCTIONALIZED DISPERSANT

(71) Applicant: Dow Global Technologies LLC, Midland, MI (US)

(72) Inventors: Sudhakar Balijepalli, Midland, MI (US); Lidaris San Miguel Rivera, Midland, MI (US); Shubhangi Hemant Nair, Pune (IN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/636,215

(22) Filed: Mar. 3, 2015

(65) Prior Publication Data

US 2015/0252213 A1    Sep. 10, 2015

Related U.S. Application Data

(60) Provisional application No. 61/949,471, filed on Mar. 7, 2014.

(51) Int. Cl.
*C09D 151/00* (2006.01)
*C09D 133/00* (2006.01)

(52) U.S. Cl.
CPC .......... *C09D 151/003* (2013.01); *C09D 133/00* (2013.01)

(58) Field of Classification Search
CPC .................................................... C09D 151/003
USPC .................................................. 524/198, 504
See application file for complete search history.

(56) References Cited

U.S. PATENT DOCUMENTS

| 4,731,419 | A | 3/1988 | Fong |
| 2009/0269510 | A1* | 10/2009 | Lieberman et al. ........... 427/555 |
| 2010/0056668 | A1 | 3/2010 | Brown |
| 2011/0319521 | A1* | 12/2011 | Lundgard et al. ............. 523/205 |

* cited by examiner

*Primary Examiner* — Kelechi Egwim
(74) *Attorney, Agent, or Firm* — Reid S. Willis

(57) ABSTRACT

The present invention relates to a composition comprising a stable aqueous dispersion of polymer particles and a dispersant adsorbed onto the surfaces of $TiO_2$ particles, wherein the dispersant is a water-soluble polymer functionalized with structural units of a carboxylic acid ester and tris(hydroxymethyl)aminomethane. The composition of the present invention is particularly useful for achieving high hiding for paints containing associative thickeners.

5 Claims, No Drawings

COATING COMPOSITION WITH TRISAMINE FUNCTIONALIZED DISPERSANT

BACKGROUND OF THE INVENTION

The present invention relates to a coating composition containing a trisamine functionalized dispersant. The dispersant is useful in promoting hiding in a paint formulation.

Paints containing associative rheology modifiers such as hydrophobically modified ethylene oxide urethane (HEUR), hydrophobically modified alkali soluble emulsion (HASE), and hydrophobically modified hydroxylethyl cellulose (HM-HEC) thickeners cause latex particles to self-associate, resulting in self-association (crowding) of $TiO_2$ particles, thereby reducing hiding efficiency as compared to compositions thickened with non-associative thickeners. This crowding effect occurs because associative rheology modifiers create a network with the binder in the paint system, thereby pushing $TiO_2$ particles closer together. It would therefore be desirable to discover a way to improve the hiding efficiency of coatings formulated with associative rheology modifiers.

SUMMARY OF THE INVENTION

The present invention addresses a need in the art by providing a composition comprising a stable aqueous dispersion of polymer particles and a dispersant adsorbed onto the surfaces of $TiO_2$ particles, wherein the dispersant is a water-soluble polymer functionalized with structural units of a carboxylic acid ester monomer and tris(hydroxymethyl) aminomethane. The present invention addresses a need in the art by providing a way of improving hiding in a paint formulation thickened with an associative thickener.

DETAILED DESCRIPTION OF THE INVENTION

The present invention addresses a need in the art by providing a composition comprising a stable aqueous dispersion of polymer particles and a dispersant adsorbed onto the surfaces of $TiO_2$ particles, wherein the dispersant is a water-soluble polymer functionalized with structural units of a carboxylic acid ester monomer and tris(hydroxymethyl) aminomethane.

A structural unit of a carboxylic acid ester monomer is illustrated:

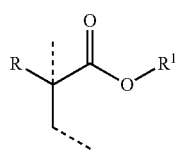

where R is H or methyl, $R^1$ is a $C_1$-$C_{20}$ alkyl group, and the dashed lines represent the points of attachment of the unit to the polymer backbone.

A structural unit of tris(hydroxymethyl)methane is represented by a transamidation unit or a transesterification unit or both:

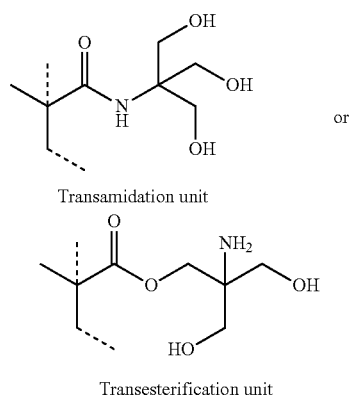

Transamidation unit

Transesterification unit

The dispersant can be prepared by contacting tris(hydroxymethyl)amine with a polymer functionalized with structural units of a carboxylic acid ester monomer, preferably a homopolymer of methyl methacrylate, in the presence of a suitable catalyst such as dibutyl tin oxide in the presence of a high boiling solvent such as N-methylpyrrolidone at an advanced temperature, preferably in the range of 150° C. to 200° C. The dispersant can also be prepared by copolymerizing tris(hydroxymethyl)acrylamide with a carboxylic acid ester monomer such as methyl methacrylate.

The resulting polymer preferably contains both transamidation and transesterification units, preferably at a mole:mole ratio of 2:1 to 10:1 in favor of transamidation; the polymer also preferably contains structural units of unreacted carboxylic acid ester, preferably methyl methacrylate.

Preferably, the mol-to-mol ratio of structural units of tris (hydroxymethyl)methane to structural units of the carboxylic acid ester monomer, preferably methyl methacrylate, is in the range of 40:60 to 90:10. A preferred $M_w$ for the dispersant is in the range of 1000 to 25,000 g/mol.

The composition of the present invention can be prepared by contacting together the dispersant, the stable aqueous dispersion of polymer particles, and the $TiO_2$. The composition may further include one or more of the following materials: rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

In the following examples, polymethylmethacrylate was obtained from Aldrich and was reported to have an $M_w$ of ~15,000 g/mol (Example 1) and ~5300 g/mol (Example 2).

EXAMPLES

Example 1

Preparation of Poly(methyl methacrylate)-g-Tris(hydroxymethyl)aminomethane

Polymethylmethacrylate (20 g, $M_w$=15,000 g/mol as supplied by Aldrich), tris(hydroxymethyl)aminomethane (70 g), N-methyl-2-pyrrolidone (NMP, 40 mL) and dibutyl tin oxide (500 mg) were mixed and heated to 190-200° C. in a reaction flask equipped with a reflux condenser for 2 h. The product was cooled and precipitated in diethyl ether, then dried at in vacuo 60° C. This polymer was reprecipitated by dissolution in NMP and precipitating in diethyl ether, then re-dried at 60° C. in vacuo.

Example 2

Preparation of Poly(methyl methacrylate)-g-Tris(hydroxymethyl)aminomethane

The procedure from example 1 was followed substantially as described except that a polymethylmethacrylate having a $M_w$ of 5,300 g/mol was used.

Paint Formulation

Paint formulations were prepared using Examples 1 and 2 as well as a comparative formulation using TAMOL™ 2002 Dispersant (a hydrophobic polyacid copolymer). In the following Table 1, $TiO_2$ refers to Ti-Pure R-706 $TiO_2$, SG-10M refers to RHOPLEX™ SG-10M Acrylic Copolymer, Texanol refers to Texanol Coalescent, RM-2020 refers to ACRYSOL™ RM-2020 NPR Rheology Modifier, RM-825 refers to ACRYSOL™ RM-825 Rheology Modifier, and 15-S-9 refers to TERGITOL™ 15-S-9 Surfactant. (TAMPOL™, RHOPLEX™, ACRYSOL™, and TERGITOL™ are all Trademarks of The Dow Chemical Company or its Affiliates.)

TABLE 1

Paint formulation Using Example 1 or Example 2 Dispersant

| | Weight (g) |
|---|---|
| Grind | |
| Dispersant (dry) | 0.07 |
| Water | 1.68 |
| $TiO_2$ | 4.69 |
| Grind Sub-Total | 6.44 |
| Letdown | |
| SG-10M | 13.94 |
| Texanol | 0.56 |
| Water | 3.55 |
| RM-2020 | 0.56 |
| RM-825 | 0.015 |
| 15-S-9 | 0.1 |
| Letdown sub-total | 18.72 |
| Total | 25.16 |

The paints were coated on a Leneta chart and Hiding (S/mil) was determined using the Kubelka-Munk S/mil Test Method.

Kubelka-Munk S/mil Test Method:

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The Y-reflectance was measured using a BYK Gardner Spectro-guide 45/0 Gloss Color spectrophotometer in each of the scribed areas five times measuring on a diagonal starting at the top of the rectangle and the average Y-reflectance recorded. A thick film draw down was prepared for each paint on Black Vinyl Charts (Leneta Form P121-10N) using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1 - R^2)} \times \ln \frac{1 - (R_B \times R)}{1 - \frac{R_B}{R}} \quad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in².

$$X (mils) = \frac{W_{pf} \ (g) \times 1000 \ (\text{mil/in})}{D \ (\text{lbs/gal}) \times 1.964 \ (g/\text{in}^3 / \text{lbs/gal}) \times A \ (\text{in})}$$

The hiding values for the formulated paints are shown in Table 2.

| Example No. | Dispersant in Paint Formulation | S/mil |
|---|---|---|
| Example 1 | PMMA-Tris $M_w$ = 15 K | 6.54 |
| Example 2 | PMMA-Tris $M_w$ = 5.2 K | 6.52 |
| Comparative 1 | TAMOL 2002 Dispersant | 5.64 |

The results demonstrate that excellent hiding can be achieved in paint formulations containing an associative thickener (in these examples, a HEUR thickener) using the PMMA-Tris dispersants of the present invention.

The invention claimed is:

1. A composition comprising a stable aqueous dispersion of polymer particles and a dispersant adsorbed onto the surfaces of $TiO_2$ particles, wherein the dispersant is a water-soluble polymer functionalized with structural units of a carboxylic acid ester and tris(hydroxymethyl)aminomethane.

2. The composition of claim 1 wherein the carboxylic acid ester is methyl methacrylate.

3. The composition of claim 2 wherein the mol-to-mol ratio of structural units of tris(hydroxymethyl)aminomethane to structural units of methyl methacrylate is in the range of 40:60 to 90:10.

4. The composition of claim 1 which further includes an associative thickener.

5. The composition of claim 1 which further includes one or more materials selected from the group consisting of rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

* * * * *